US011861012B2

(12) United States Patent
Su

(10) Patent No.: US 11,861,012 B2
(45) Date of Patent: Jan. 2, 2024

(54) MEMORY DEVICE HAVING SAFETY BOOT CAPABILITY

(71) Applicant: MACRONIX INTERNATIONAL CO., LTD., Hsinchu (TW)

(72) Inventor: Chun-Lien Su, Taichung (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 266 days.

(21) Appl. No.: 17/365,847

(22) Filed: Jul. 1, 2021

(65) Prior Publication Data

US 2023/0004649 A1  Jan. 5, 2023

(51) Int. Cl.
| G06F 9/00 | (2006.01) |
| G06F 21/57 | (2013.01) |
| H04L 9/32 | (2006.01) |
| G06F 11/10 | (2006.01) |
| G06F 9/4401 | (2018.01) |

(52) U.S. Cl.
CPC ........ *G06F 21/575* (2013.01); *G06F 11/1068* (2013.01); *H04L 9/3239* (2013.01); *G06F 9/4401* (2013.01)

(58) Field of Classification Search
CPC ... G06F 21/575; G06F 11/1068; H04L 9/3239
USPC .......................................................... 713/2
See application file for complete search history.

(56) References Cited

U.S. PATENT DOCUMENTS

| 2007/0147144 A1* | 6/2007 | Tokiwa | G11C 29/76 365/185.09 |
| 2010/0115256 A1* | 5/2010 | Challener | G06F 8/66 713/2 |
| 2012/0060039 A1* | 3/2012 | Leclercq | H04L 9/3265 713/189 |
| 2012/0079287 A1* | 3/2012 | Leclercq | G06F 21/575 713/192 |
| 2015/0019793 A1* | 1/2015 | Dover | G06F 21/57 711/103 |
| 2016/0026471 A1* | 1/2016 | Lee | G06F 9/4401 711/103 |
| 2016/0147997 A1* | 5/2016 | Dover | G06F 9/4406 713/2 |
| 2017/0337380 A1* | 11/2017 | Domke | H04L 63/06 |

(Continued)

FOREIGN PATENT DOCUMENTS

| TW | 202044778 A | 12/2020 |
| TW | 202109300 A | 3/2021 |

OTHER PUBLICATIONS

Federal Information Processing Standards (FIPS) Pub 180-4, Aug. 2015, 36 pages.

(Continued)

*Primary Examiner* — Volvick Derose

(74) *Attorney, Agent, or Firm* — Paul A. Durdik; Haynes Beffel & Wolfeld LLP

(57) ABSTRACT

A method provides the capability to maintain integrity of a data image stored by computing a hash value ("digest") of the data image and comparing the hash value computed for the data image with a hash value computed for the data image and kept in a non-volatile area of memory. Bit flips in the data image that are a result of memory hardware errors reveal themselves as differences in the digest computed for the data image and the computed digest for the data.

21 Claims, 10 Drawing Sheets

(56) References Cited

U.S. PATENT DOCUMENTS

| | | | |
|---|---|---|---|
| 2018/0032403 A1* | 2/2018 | Yu | G06F 11/1417 |
| 2019/0050602 A1 | 2/2019 | Sela et al. | |
| 2020/0310913 A1* | 10/2020 | Mondello | B60W 50/14 |
| 2021/0049309 A1* | 2/2021 | Su | G06F 3/062 |
| 2023/0004649 A1* | 1/2023 | Su | G06F 21/575 |
| 2023/0134058 A1* | 5/2023 | Carey | G01R 31/2896 |
| | | | 702/124 |
| 2023/0138736 A1* | 5/2023 | Yan | G06F 11/1451 |
| | | | 707/645 |

OTHER PUBLICATIONS

Rescorla, "Diffie-Hellman Key Agreement Method," Internet Engineering Task Force IETF RFC 2631 (//tools.ietf.org/html/rfc2631), Jun. 1999, 13 pages.

* cited by examiner

MEMORY DEVICE HAVING SAFETY BOOT CAPABILITY

BACKGROUND

Field

The present invention relates to improved data integrity in the storage, retrieval and loading operations of semiconductor memory, and specifically to semiconductor memory operations integrity related to stored critical use data requiring an integrity level to be maintained, such as stored boot instructions.

Description of Related Art

In many modern computer systems, the system is booted by copying code located in external flash memory into local RAM and then executing the instructions as copied from RAM.

While there are perceived advantages to this approach, one issue that can arise is that a system will not boot successfully if any integrity issue exists with the code stored in the external flash. Computer memory however is subject to failure like all hardware. Such failures, even if relatively infrequent, can pose potentially adverse results in critical operations such as boot strap loading a computer, as well as other computing operations requiring high data integrity from memory.

It is desirable to provide improved integrity in the storage, retrieval and loading operations of semiconductor memory, especially semiconductor memory operations related to boot code stored in memory.

SUMMARY

The disclosed technology provides methods for maintaining integrity of a data image during operations of semiconductor memory and memory devices embodying these methods. In general, by way of overview and in implementations, there is provided the capability to maintain integrity of a stored data image (i.e., copy of the data) of a working dataset by computing, using a secure algorithm, a secure hash value ("digest") of the data image and comparing the hash value computed for the data image with prior hash value(s) computed for original copies of the data image(s). Original copies of the data can be kept in a non-volatile area of memory. Bit flips in the data image that are a result of memory hardware errors will reveal themselves as differences in the prior digest computed for the data image and the digest computed for the original copy of the data. When device logic encounters a difference between the computed hash value and the prior digest, the device logic determines an integrity fault has occurred with the data image corresponding to the computed hash value. Remedial action taken in implementations can include alerting a host via output signal or interrupt, swapping data read from a stored redundant data image of the dataset or combinations thereof. The redundant data image can be the same as, or different from first data image, e.g., the redundant data image can store a redundant copy boot code that can be the same as, or different from, the first copy boot code. Examination can be triggered at power on or reset time, and/or in some implementations responsive to receiving a command.

One implementation of our technology is a memory device with safety boot capability. The memory device, typically a flash but our technology is applicable to a broader range of devices, comprises a plurality of non-volatile registers that store address information of boot code and at least one redundant copy of boot code stored in a memory array. A non-volatile storage area that keeps a hash digest. An input/output interface enables posting internal status register states to I/O data units connecting to a host and/or other components external to the memory device. Data path circuits connect between non-volatile registers, the memory array, the non-volatile storage area, and the interface. Logic circuitry examines integrity of the boot code stored in the memory array by comparing a hash calculation of the boot code and a stored hash calculation that was determined and stored in the non-volatile storage area holding the hash digest kept and to provide as output boot code or redundant boot code in accordance with an integrity examination result. Variants include embedded operation, in which the device performs the integrity checking on power up without further command or input; on-the-fly operation, in which the device integrity checks boot code being read out by a host or other device as it is being read. Error correcting code (ECC) circuitry can provide a first tier check of integrity, and a messaging hash algorithm can provide a second tier check. Some implementations include the ECC correcting errors in the boot code. Some implementations swap out portions of boot code with boot code from redundant copy(ies) when errors are encountered. Some implementations keep the hash computed for the boot code in an encrypted digest, ensuring that only hosts providing the correct key can access a proper copy of the boot code hash. Some implementations store boot code and redundant data images in different memory banks to take advantage of concurrency, speeding operation.

One method for maintaining integrity for a data image of boot instructions during operations of semiconductor memory includes detecting by a semiconductor memory a power on reset condition responsive to a power on event, or a reset instruction or reset signal from a host. A semiconductor memory embodying our method can automatically examine integrity of boot instructions for the host. For example, by conducting a hash calculation of a first data image comprising boot instructions for the host; and comparing the hash calculation with a stored hash calculation determined for the first data image. The host can be alerted that the first data image experienced an integrity examination fault whenever a discrepancy between the hash calculation and the stored hash calculation determined for the first data image is detected. Remedial action taken in implementations can include alerting a host via output signal or interrupt, swapping data read from a stored redundant data image of the dataset or combinations thereof.

In another implementation, upon detecting any of a power on reset condition or a reset instruction or signal by a host, the host is started by execution of ROM stored code, or code from embedded flash memory, to configure hardware and prepare to load into RAM either a bootloader or an application residing in external flash (i.e., the memory device embodying our method). As a data image of this code is read out of memory, a semiconductor memory embodying our method can detect the power on reset condition, or reset instruction or reset signal from the host or receive a command indicating boot code is being read out of memory. The semiconductor memory embodying our method can automatically conduct an on-the-fly examination of the integrity of the boot code data image as it is being read by the host. In a mode called "shadowing", as the host reads one or more bytes of boot code from a stored data image, our method examines bytes requested by the host and updates a hash calculation for the data image based upon the bytes read each time. When no further bytes are to be read from the data image, the resulting hash calculation is compared with a stored hash calculation determined for the boot code data image. The host can be alerted that the data image experienced an integrity examination fault whenever a discrepancy between the hash calculation and the stored hash calculation determined for the data image is detected. Remedial action taken in implementations can include alerting a host via output signal or interrupt, swapping data read from a stored redundant data image of the dataset or combinations thereof.

In a further implementation, a method for maintaining integrity in a data image during operations of semiconductor memory includes detecting that a read request received from a host is to read data from a data image stored in a memory array of a semiconductor memory. The method further includes conducting a first tier integrity check using ECC and a second tier integrity check using a hash calculation of the data read from the data image. The ECC may be able to correct some errors arising in the boot code. The hash calculation is compared with a stored hash calculation determined for the data image and stored as a digest. The host can be alerted that the data image experienced an integrity examination fault whenever a discrepancy between the hash calculation and the stored hash calculation determined for the data image is detected.

In a representative implementation, a memory device comprises a memory array including a plurality of memory locations arranged into banks of memory locations, such as a first memory bank and a second memory bank for example, an input/output interface for I/O data units, data path circuits connected between the memory array and the interface, a non-volatile storage area that keeps a digest, a command decoder circuit that, responsive to commands received at the input/output interface to read and write to memory locations in the plurality of memory locations, directs read and write operations to blocks of storage locations interleaved among at least the first memory bank and the second memory bank, and hash engine logic circuitry that examines integrity of a data image stored in the memory array by comparing a hash calculation of a data image stored in at least one of the first memory bank and the second memory bank and a stored hash calculation determined and stored with the digest kept and report an integrity examination result by changing a state of a status register or a pin to signal the pass or fail.

The technology disclosed is applicable to all types of memory having command interfaces. Example embodiments are described in which a memory array comprises a flash, however, the technologies described herein can be applied to other types of memory devices as well. Some embodiments implement our redundancy mechanism in a NOR flash memory. Other embodiments implement the redundancy mechanism in a NAND flash memory. Still other embodiments implement redundancy mechanism in a memory that is not a flash memory. Further, while discussed with reference to example implementations used in applications for storing and providing instructions to boot load a computer (i.e., "boot code"), our disclosed technology is applicable in a wide variety of other applications in which integrity of memory devices is needed.

Other aspects and advantages of the present invention can be seen on review of the drawings, the detailed description and the claims, which follow.

DETAILED DESCRIPTION

A detailed description of embodiments implementing the disclosed technology is provided with reference to the FIGS. 1-7.

Hardware failures can occur and there are even standards promulgated by regulatory bodies concerning them. Functional safety standards define safety integrity using defined levels with each level denoting more stringent safety levels and less probability of failures. For example, methods of how to apply, design, deploy and maintain automatic protection systems called safety-related systems by IEC 61508 standard. The safety integrity level (SIL) provides a target to attain for each safety function. A risk assessment effort yields a target SIL for each safety function. In another example, ISO 26262 standard defines different criterions of probabilistic metric for random hardware faults (PMHF) for different Automotive Safety Integrity Level (ASIL) levels. Semiconductor memories are not exception.

In general, by way of overview and in implementations, there is provided the capability to maintain integrity of a data image stored by computing using a secure algorithm a hash value ("digest") of the data image and comparing the hash value computed for the data image of a working dataset (i.e., copy of the data) with a hash values computed for the working dataset stored as a digest and kept in a non-volatile area of memory. Bit flips in the data image that are a result of memory hardware errors will reveal themselves as differences (i.e., an integrity fault) in the digest computed for the data image and the digest computed for the data and stored. When device logic encounters a difference between the computed hash value and a stored digest, the device logic determines an integrity fault has occurred. Remedial action taken in implementations can include alerting a host via output signal or interrupt, swapping data read from a stored redundant data image of the dataset or combinations thereof.

Figure 1:
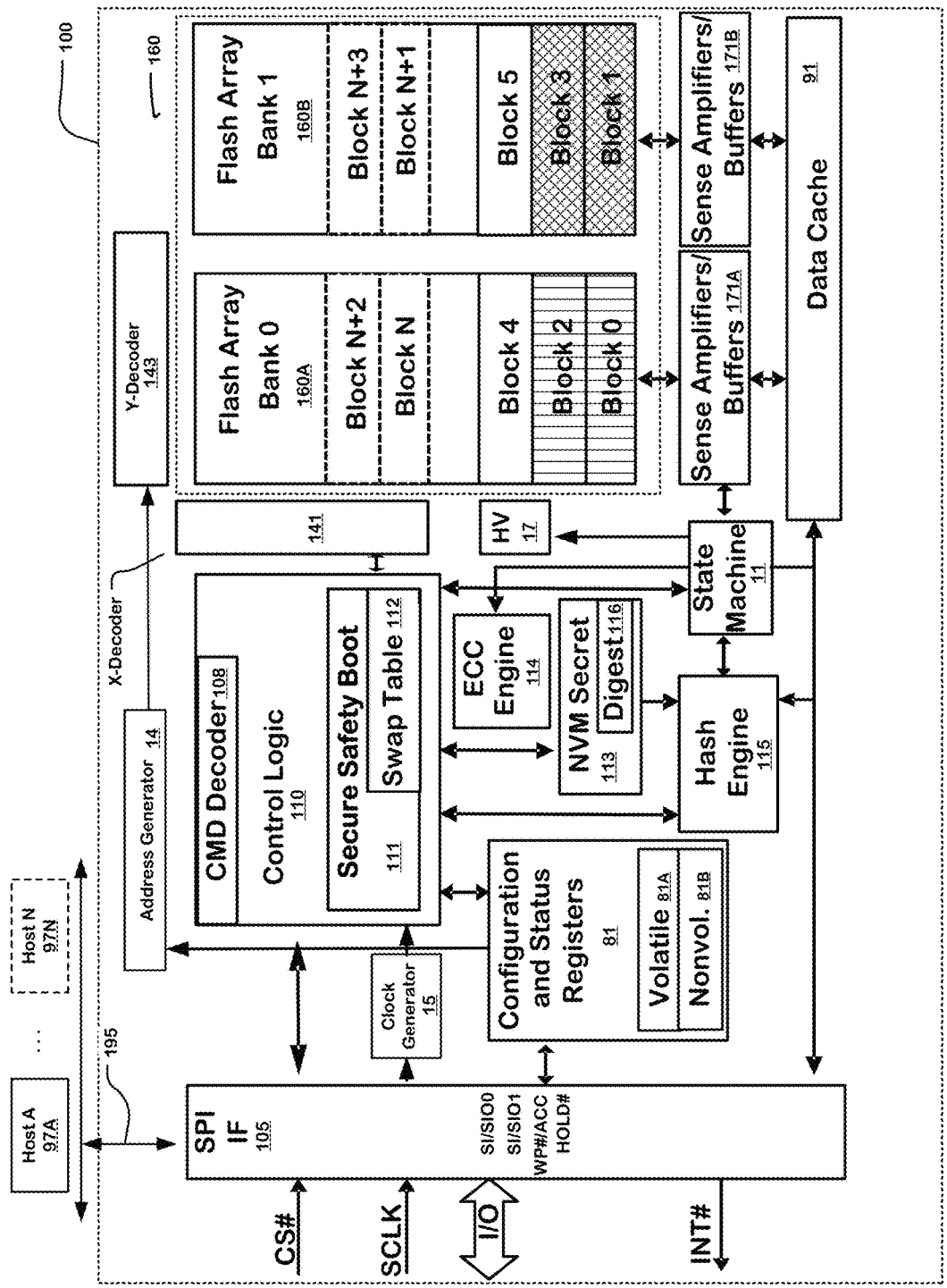
FIG. 1 is a simplified block diagram of an integrated circuit memory device suitable for embodying a mechanism for maintaining integrity in a data image during memory device operations.

FIG. 1 is a simplified block diagram of a memory system including a flash memory device implemented on an integrated circuit suitable for embodying a mechanism for maintaining integrity in a data image during memory device operations as described herein. The memory device can be implemented on a single integrated circuit chip, on a multichip module, or on a plurality of chips configured as suits a particular need. This diagram is merely an example, which should not unduly limit the scope of the claims herein. One of ordinary skill in the art would recognize other variations, modifications, and alternatives.

As shown, integrated circuit device 100 (also referred to as memory device, memory chip, flash device, etc.) includes a mechanism for checking the integrity of stored copies of data images that includes Secure safety boot logic 111 embedded logic circuitry that coordinates the actions of hash engine 115, Nonvolatile memory (NVM) Secret area 113 and swap table 112 to examine the integrity of a data image of a dataset comprising boot code (i.e. instructions to a processor to be executed at startup by the processor in order to initialize the operating system) whenever a power on reset condition or a reset instruction or signal is detected. If an integrity fault is detected by the hash engine 115 working in conjunction with stored digests from NVM secret area 113, the secure safety boot logic 111 can signal to the host 97A being booted that an integrity fault has occurred in the boot code and have the host to check the status registers for details. Signaling can be by output pin, interrupt, or combinations thereof. Further, in some implementations security safety boot logic 111 can modify entries in swap table 112 corresponding to a block or blocks of memory array 160 that store the data image that experienced the integrity fault in order to "swap" in corresponding blocks of code from a redundant copy of the boot code. In one implementation, this examination can be triggered by a host "on demand" by exchange of commands.

Integrated circuit memory device 100 includes a memory array 160 including single-level cells or multiple-level cells that store two or more bits of data per cell, on an integrated circuit substrate. The memory array 160 can be a flash memory implemented using two-dimensional or three-dimensional array technology. One implementation of memory array 160 stores data at an address corresponding to a location in memory array 160. The address is decoded by X-decoder 141 and Y-decoder 143. In some integrity maintaining memory embodiments, memory array 160, x-decoder 141, y-decoder 143 and address generator 14 implement storage blocks of memory interleaved among different memory banks 160A, 160B. It results in an area of multiple blocks distributed into different banks. Interleaved blocks of memory locations in different banks enables embodiments to conduct swapping operation and even later recovering operation in memory devices in which read while write is implemented. In some implementations, a page buffer (not shown in FIG. 1 for clarity sake) can be coupled to memory array 160 to provide temporary storage for memory operations. In a read operation, the data is transferred from memory array 160 through sense amplifiers/buffers 171A, 171B. For write operation, data is transferred from data cache 91, to sense amplifiers/buffers 171A, 171B, and then written into memory array 160 in either memory bank 0 160A or memory bank 1 160B in accordance with the input address. (A read operation, by contrast, will not only check the input address but also the swap table.) For high voltage operation, e.g., for a write operation, high voltage generator 17 is activated. Some implementations may omit separate memory banks, relying instead on a uniform array. On the other hand, some implementations may include more than two memory banks depicted by FIG. 1.

Control logic 110, working in conjunction with Hash engine 115 (and in some implementations with ECC engine 114), examines the integrity of the designated data image stored in memory array 160 by comparing results of originally checked copies of the data (e.g., original data images), stored in the digests kept along with the original data images stored in the memory array, with results of a current hash calculated by Hash engine 115 (and in some implementations with ECC engine 114) for a currently requested copy of the data image (e.g., current data image or the data image). The hash digest of the designated data image is calculated, maybe externally by users or by the hash engine 115 internally, and then stored to the NVM secret along with the data image stored in the memory array. The secret is non-volatile and in one implementation is allocated a reserved portion of the memory array, not accessible to users, to implement persistent storage against power loss. The configuration and status register, 81, can also be implemented in similar approach. That is the non-volatile registers are also from the reserved portion of the memory array. Some implementations maintain two data images of the same dataset, first copy and a redundant second copy; enabling the system to switch, using swap table 112, to the redundant copy if an integrity fault is detected with the first copy. The data image is preferably boot instructions for booting a host 97 coupled to device 100, but can be practically any type of dataset in other applications for which high data integrity is desired (e.g., systems used in space travel, aircraft, nuclear power station controllers, and many other important applications).

In one implementation, ECC engine 114 can also be used as an integrity checking mechanism. It is not only competent to detect errors but also able to correct errors within its capability according to the ECC scheme employed. ECC engine 114 can be implemented in page-based hashing to provide proactive error detection and correction if the number of error bits is within its designed capability before reading out the whole boot code in its entirety. Once ECC correction fails, control logic 110 will resort to the corresponding redundant area. However, ECC can only protect a page rather than whole boot code/image. Hash engine 115 could implement any widely used message digest algorithm such as MD5, SHA256 or the like. SHA256 is a member of the Secure Hash Algorithm 2 (SHA2) family of cryptographic hash functions designed by the US National Security Agency (NSA). For further discussion and further detail of the SHA2 family of algorithms, reference by the skilled person can be had to "*Federal Information Processing Standards (FIPS) PUB* 180-4" (csrc.nist.gov/publications/detail/fips/180/4/final), the entirety of which is incorporated herein by reference for all purposes. In the embodiment illustrated by FIG. 1, SHA256 is used to implement the Hash engine 115. Of course other implementations will embody different members of the SHA-2 family, which presently consists of six hash functions with digests (hash values) that are 224, 256, 384 or 512 bits: SHA-224, SHA-256, SHA- 384, SHA-512, SHA-512/224, SHA-512/256. Of these, SHA-256 and SHA-512 are novel hash functions computed with 32-bit and 64-bit words, respectively.

A non-volatile 113 area is provided to keep the digest 116. In some implementations, these NVM secret 113 and/or NVM configuration registers can be a reserved part in the flash array 160. An output of 256 bits from hash engine 115 is stored in a Non-volatile memory (NVM) Secret area 113. Optionally, in some implementations a hash result can be encrypted by a secret key, either symmetric or asymmetric. Preferably, asymmetric encryption is used in implementations in which authentication is imposed. The key is used to encrypt the digest 116. If the wrong key is provided by host, an erroneous decryption result for the digest 116 would be obtained, and the comparison will never pass. For embedded embodiments, the memory chip may not output any data if this comparison fails (e.g., authentication failed and no data output). Keys can be provided to hosts 97A-97N using Diffie-Hellman Key Exchange, pre-installed by manufacturer, locally generated from random number generator, combinations of these, and other key exchange protocols. For background information about one particular variant of Diffie-Hellman Key Exchange, reference can be had to Internet Engineering Task Force IETF RFC 2631 (//tools.ietf.org/html/rfc2631); the entirety of which are incorporated herein by reference for all purposes.

Accordingly, the integrity check performed by Hash engine 115 will fail if either: (i) any bit flip is detected; or (ii) authentication failed.

A swap table 112 is used to swap between copies of a same data image. Such a swap can be triggered when the hash engine 115 determines that a fault exists with one copy of the data. If the data image is boot code, a finding of a fault in a copy of the boot code (ie., an integrity fault) can be detected by the secure safety boot 111 logic. An example of logic circuitry implementing Swap table 112 is depicted in FIG. 2, a simplified logic diagram of logic circuitry implementing a swap table and selecting from among memory banks in an integrated circuit memory array suitable for use with a mechanism for maintaining integrity in a data image during memory device operations like that of FIG. 1.

Figure 2:
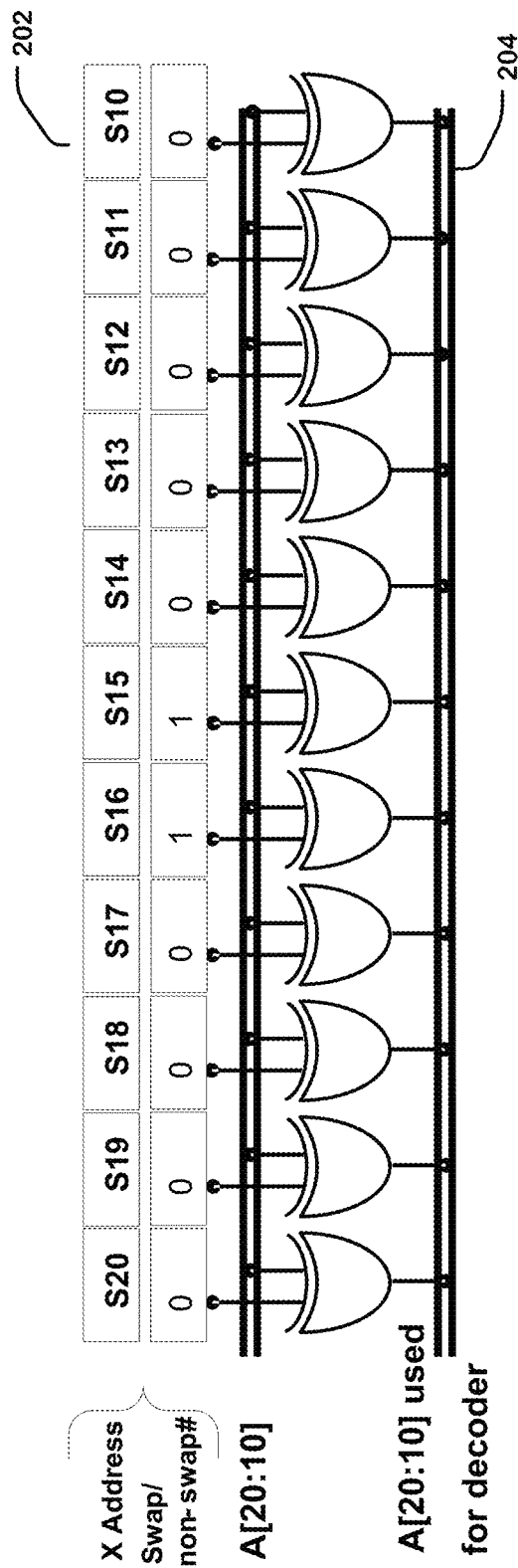
FIG. 2 is a simplified logic diagram of logic circuitry implementing a swap table and selecting from among memory banks in an integrated circuit memory array suitable for use with a mechanism for maintaining integrity in a data image during memory device operations like that of FIG. 1.

As shown in FIG. 2, an example swap table 200 comprises a set of registers 202 used to indicate which address bit(s) are swapped, and a set 204 of exclusive OR gates is used to flip address bits. In FIG. 2, a representative address "X", for example A20-A10, is input to exclusive OR gates 204 along with the content of swap table 112 and the result is applied to address generator 14 and decoders 141, 143 of device 100. In this example, bits S15 and S14 of registers 202 are flagged and corresponding bits A15 and A14 of address X are swapped accordingly.

With renewed reference to FIG. 1, input/output is performed by interface 105 comprising several input blocks coupled to respective input/output pins to provide connectivity to a host, such as host 97A. In one embodiment, the interface 105 is a serial interface including a set of I/O ports 195 through which commands, addresses and data are communicated. The serial interface can be based on or compliant with a Serial Peripheral Interface (SPI) bus specification in which the command channel shares the I/O pins used by address and data. For example, the integrated circuit memory device 100 can include input/output ports using pins for receiving and transmitting SPI bus signals. One pin can be connected to an input data line carrying serial input data/address signal SI, usable for commands as well. Another pin, or multiple other pins, can be connected to an output data line or output data lines carrying serial output data signal SO. Another pin can be connected to a clock line carrying serial clock signal SCLK that is coupled to Clock Generator 15, which in turn is coupled to command decoder 108 and control logic 110. Control logic 110 is operably coupled to receive a chip select signal CS # on a CS # input terminal of interface 105. Commands or instructions may be input through input SI/SIO0 block, for example, and then transferred to control logic 110. Control logic 110, in combination with state machine 11, interprets and executes the command such as a read, erase, or program operation. In an embodiment, control logic 110 also receives a signal from WP #/ACC block of interface 105 to perform a write protect function, and a signal from HOLD # block of interface 105 to keep a clock signal from entering the state machine 11. Data may be input through SI/SIO0 block, SO/SIO1 block, WP #/ACC block, and HOLD # block, which are coupled to data cache 91. Data may be output through SI/SIO0 block, SO/SIO1 block, WP #/ACC block, and HOLD # block, which are coupled the output buffer 91. Other types of interfaces, including parallel interfaces can be used as well. The I/O ports 195 on a particular integrated circuit memory device 100 can be configured to provide output data with an I/O data width, which can be, for some examples, 1, 4, 8, 16, 32 or more bits in parallel per interface clock (e.g. SCLK) cycle. The I/O interface 105 can include a FIFO buffer, a shift register buffer or other supporting circuits along with a transmitter for transmitting data received at the interface on ports at a port clock rate, such as an SCLK rate for an SPI interface.

The memory array 160 can comprise floating gate memory cells or dielectric charge trapping memory cells configured to store single bit or multiple bits per cell, by the establishment of multiple program levels that correspond to amounts of charge stored, which in turn establish memory cell threshold voltages VT. The description herein is based on the use of charge trapping memory cells, such as floating gate flash memory and dielectric charge trapping flash memory. The technology can be used with other memory cell technologies. In other examples, the memory cells may comprise programmable resistance memory cells, configured for multiple bits per cell, by the establishment of multiple program levels that correspond to amounts of resistance. Memory devices as described herein can be implemented using multichip modules, stacked chips and other configurations as well. The memory device can be implemented on a single integrated circuit chip, on a multichip module that includes one or more integrated circuits in a common package, or on a plurality of chips configured to suit a particular need.

In the example shown in FIG. 1, control logic 110 includes circuits implementing a bias arrangement state machine, or machines, which controls, or control, the application of supply voltages generated or provided through the voltage supply or supplies (not shown in FIG. 1 for clarity sake), such as read, verify and program voltages for a set of selectable program and read operations used in the MLC operating methods described herein. The control logic 110 are coupled to the cache circuits 91 and the memory array 160 and other elements of the integrated circuit as needed. The circuitry in the control logic 110 include logic to control multiple-level program operations described in more detail below. The control logic 110 can include modules implemented using special-purpose logic circuitry as known in the art. In alternative embodiments, the control logic 110 can include modules implemented using a general-purpose processor, which can be implemented on the same integrated circuit, which executes a computer program to control the operations of the memory device 100. In yet other embodiments, a combination of special-purpose logic circuitry and a general-purpose processor can be utilized for implementation of modules in control logic 110.

In the illustrated embodiment, NVM Secret 113 can be used to store digest 116. In some implementations, these NVM secret 113 and/or NVM configuration registers can be a reserved part in the flash array 160. Information from the NVM reserved section can be read out from the flash array 160 at power on. Address, length, redundancy, and other boot information, are part of configuration and status registers 81, specifically of non-volatile type 81B, and coupled to control logic 110. The configuration and status registers 81 include volatile 81A and non-volatile 81B areas that can store parameters for a plurality of selectable program operations and a plurality of selectable read operations, according to the processes described herein.

In implementations, the host 97A can comprise a general purpose processor, a special purpose processor, a processor configured as a memory controller, or other processor that uses the memory device 100. All or part of the host 97A can be implemented on the same integrated circuit as the memory. Although the above has been shown using a selected group of components for the integrated circuit device, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification and more particularly below.

Figure 3A:
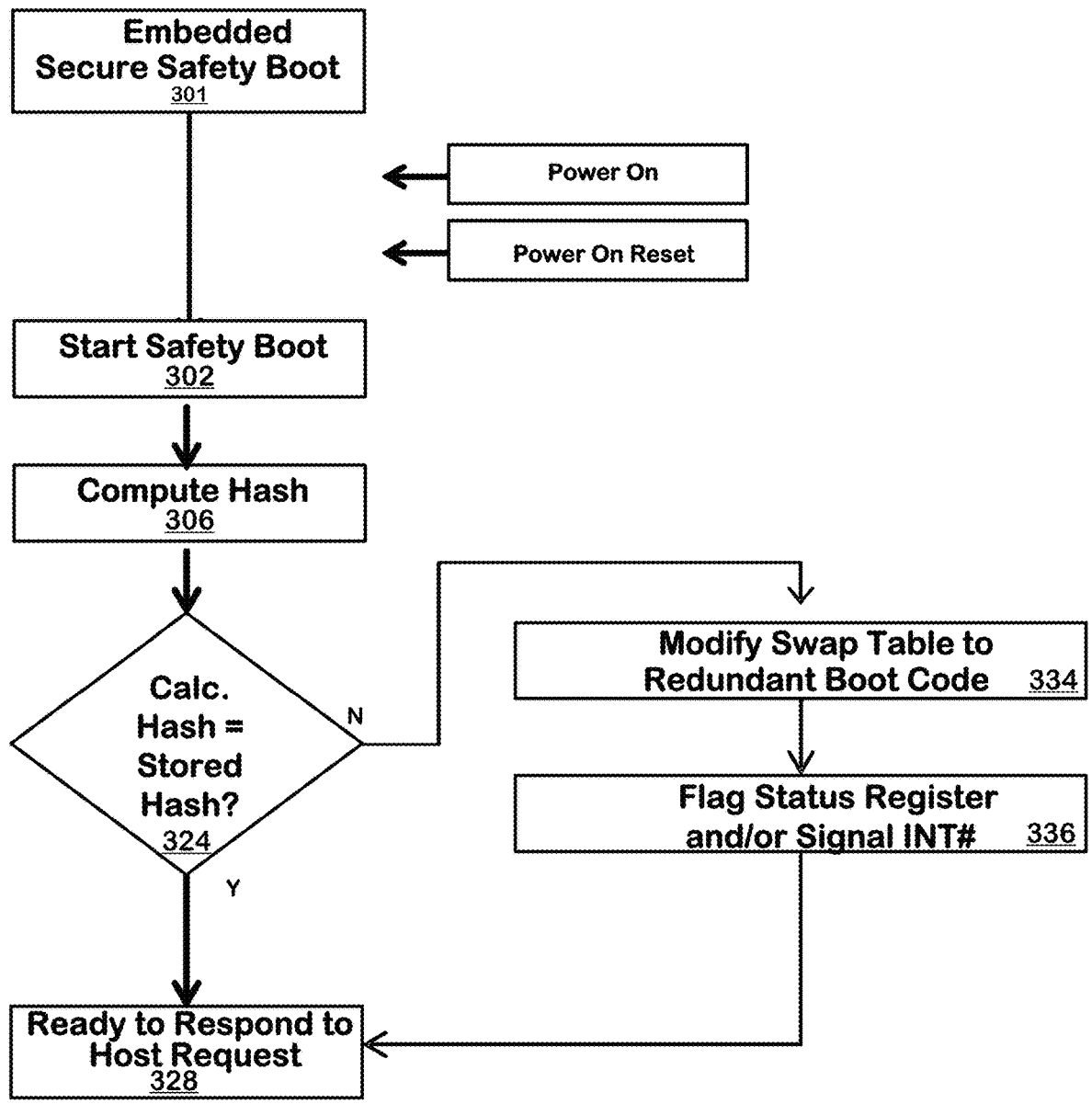
FIG. 3A is a state diagram illustrating an embedded integrity checking without ECC hashing operation for an embodiment of an integrated circuit memory device having an integrity maintenance mechanism like that of FIG. 1.
Figure 3B:
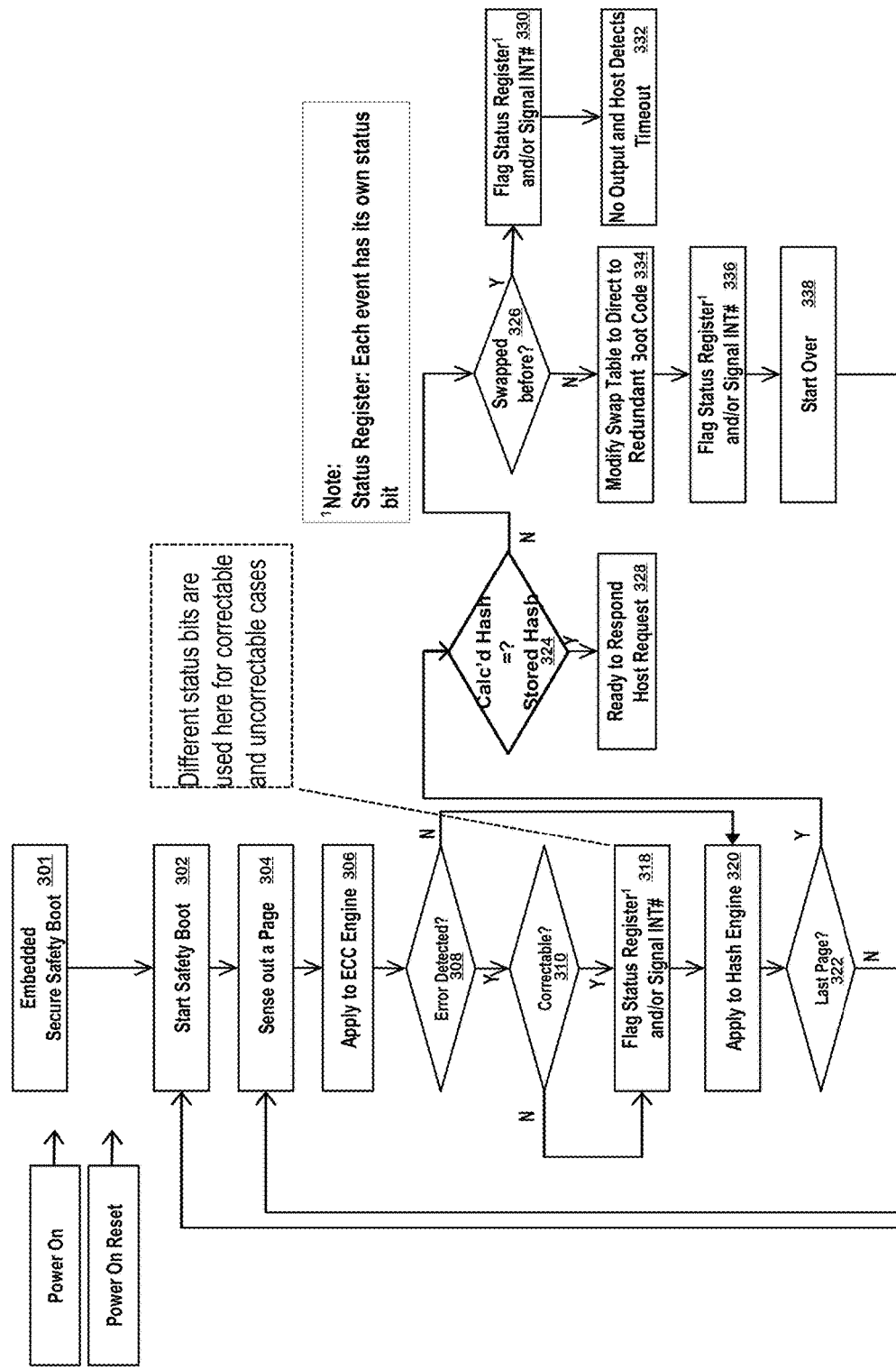
FIG. 3B is a state diagram illustrating an embedded integrity checking with ECC hashing operation for an embodiment of an integrated circuit memory device having an integrity maintenance mechanism like that of FIG. 1.
Figure 3C:
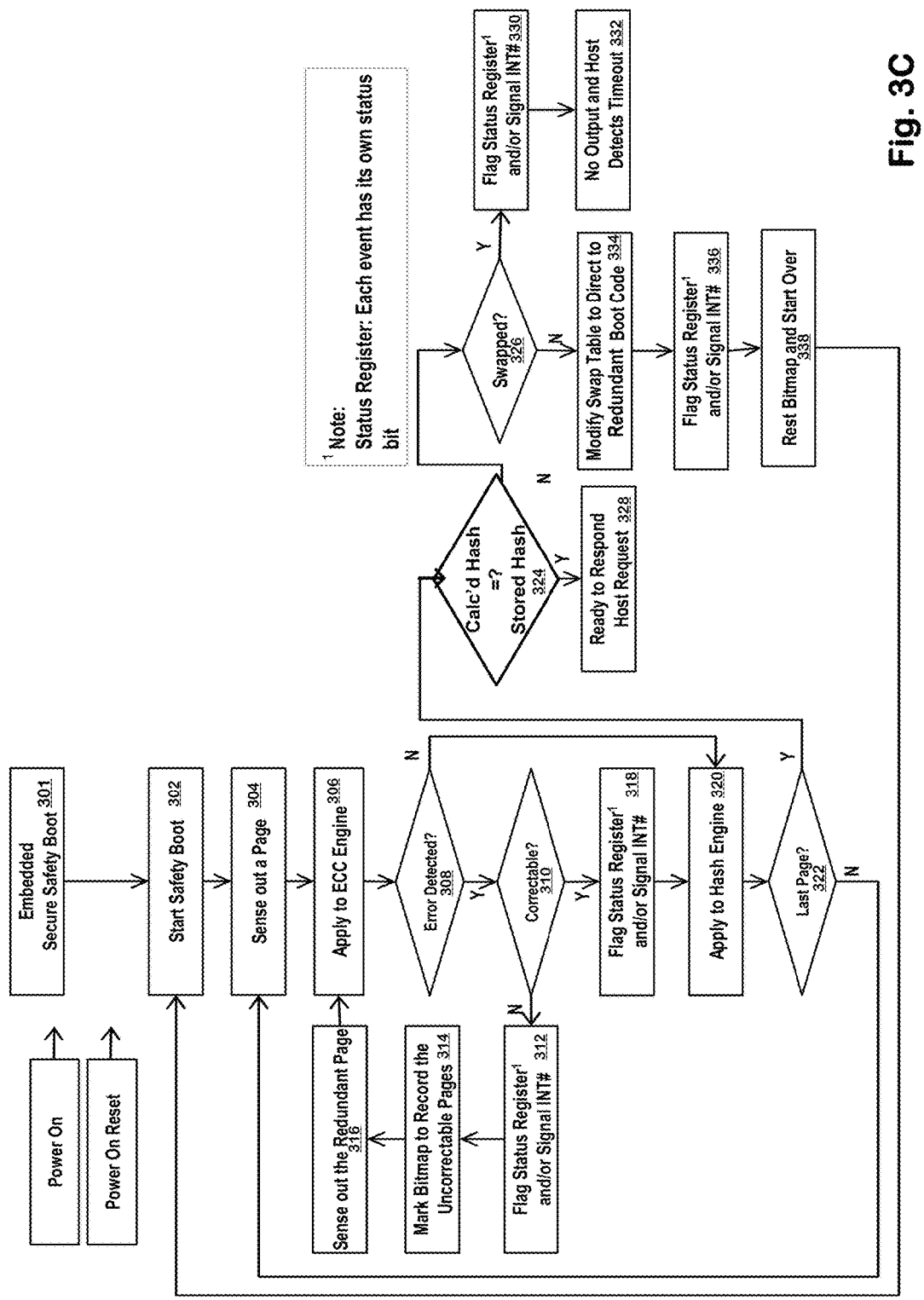
FIG. 3C is a state diagram illustrating another implementation of an embedded integrity checking with ECC hashing operation for an embodiment of an integrated circuit memory device having an integrity maintenance mechanism like that of FIG. 1.
Figure 4A:
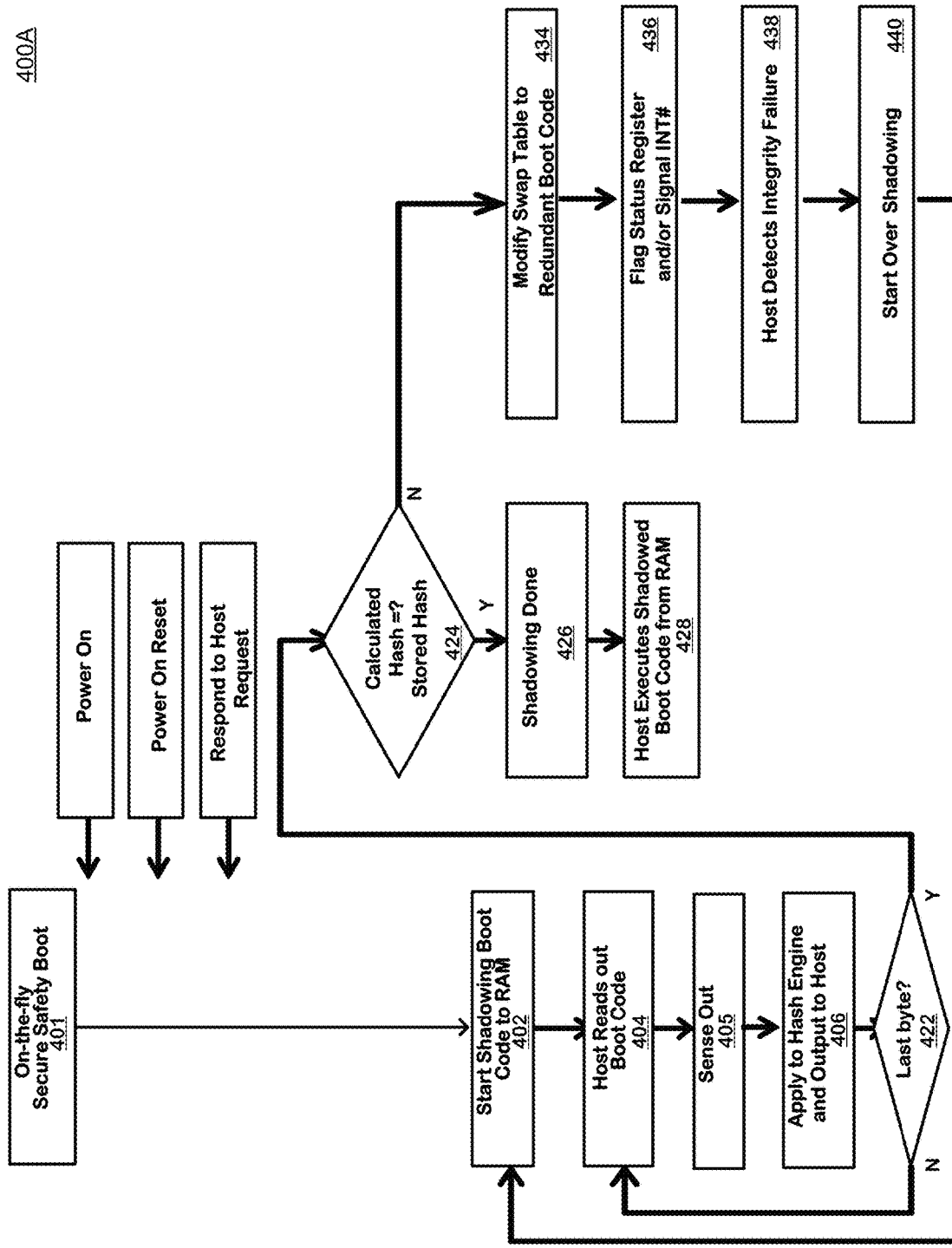
FIG. 4A is a state diagram illustrating an on-the-fly integrity checking without ECC hashing operation for an embodiment of an integrated circuit memory device having an integrity maintenance mechanism like that of FIG. 1.
Figure 4B:
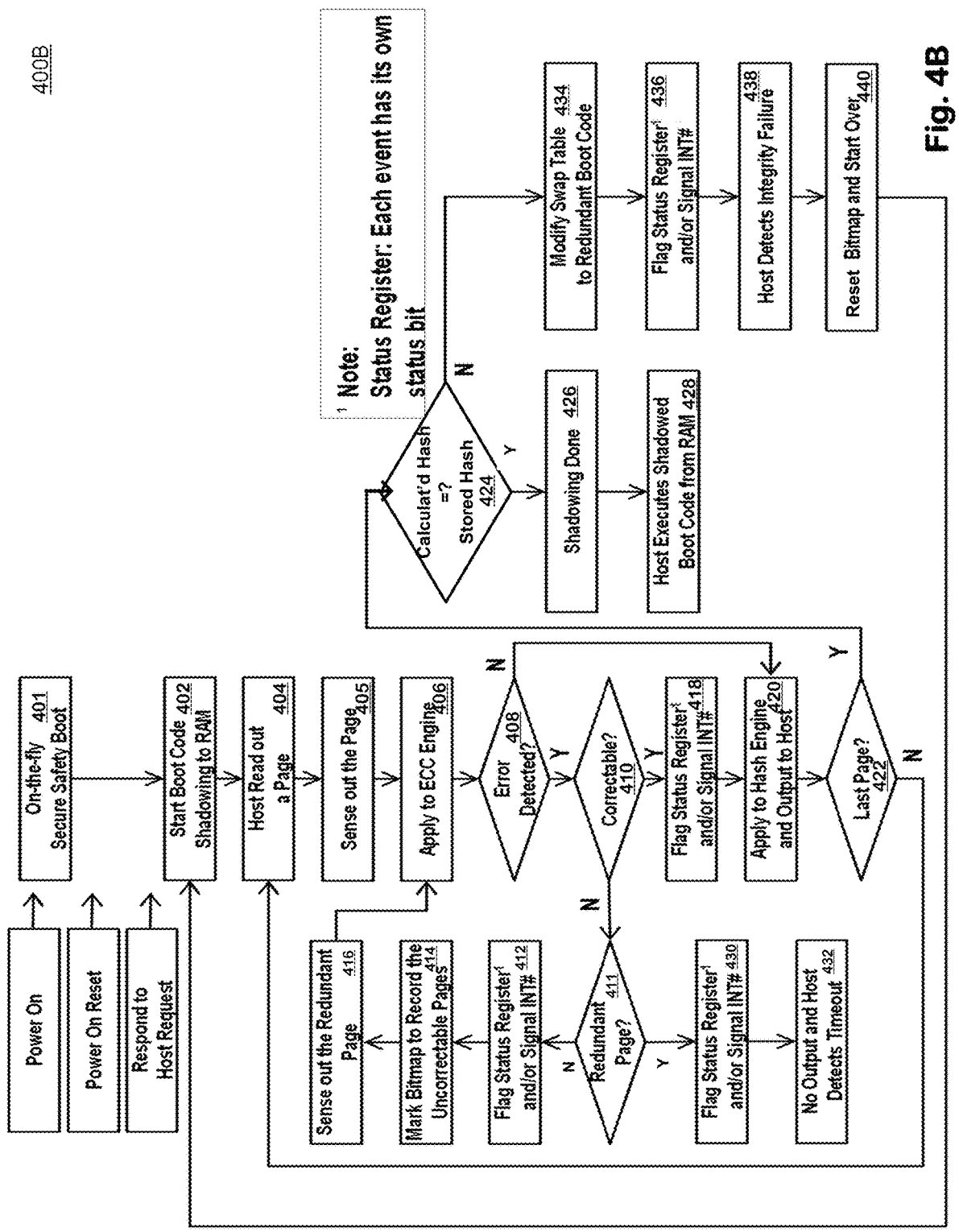
FIG. 4B is a state diagram illustrating an on-the-fly integrity checking without ECC hashing operation for an embodiment of an integrated circuit memory device having an integrity maintenance mechanism like that of FIG. 1.
Figure 5:
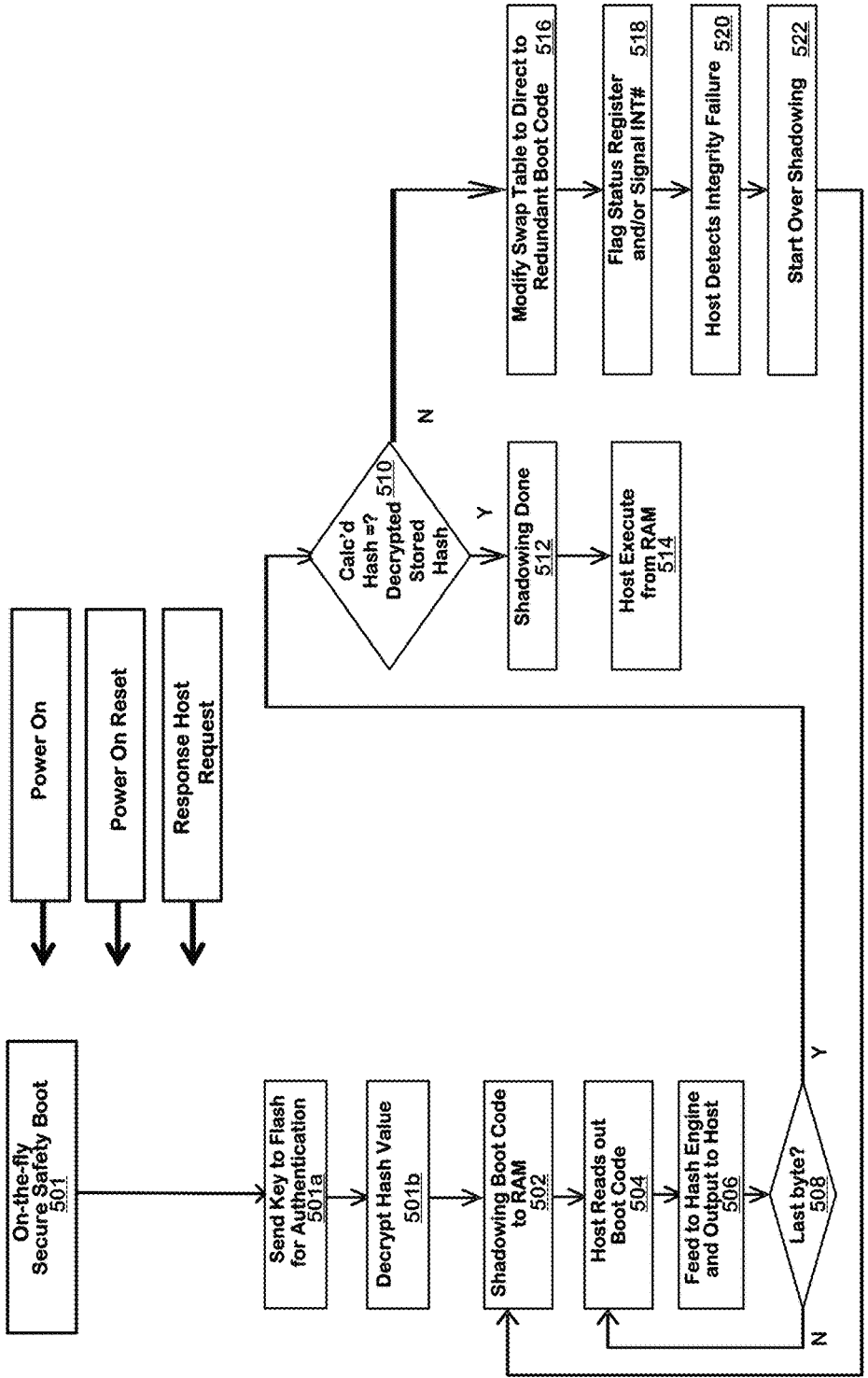
FIG. 5 is a state diagram illustrating an on-the-fly integrity checking without ECC hashing operation using encrypted digests for an embodiment of an integrated circuit memory device having an integrity maintenance mechanism like that of FIG. 1.

Having described an example integrity maintenance architecture for a storage memory, next examples of boot operations conducted using integrity verification mechanisms like that of FIGS. 1 and 2 will be described with reference to state diagrams of FIGS. 3A, 4A, and 5, illustrating example embodiments without ECC implemented integrity checking and FIGS. 3B, 3C, and 4B, illustrating example embodiments with ECC implemented integrity checking and flowchart of FIGS. 6-7. FIG. 3A is a state diagram illustrating an embedded integrity checking without ECC hashing operation for an embodiment of an integrated circuit memory device 100 having an integrity maintenance mechanism like that of FIG. 1.

Embedded Integrity Verification without ECC Hashing Operations

Now with reference to state diagram 300A of FIG. 3A, an example of an embedded integrity checking without ECC hashing operation for a boot code data image will be described. FIG. 3A depicts a state diagram 300A illustrating an embedded integrity checking without ECC hashing operation for an embodiment of an integrated circuit memory device 100 having an integrity maintenance mechanism like that of FIG. 1. In FIG. 3A, secure safety boot 111 of device 100 embeds a secure safety boot logic 301, which is preferably implemented in logic circuitry. If the embedded integrity examination option is set to "on", then the secure safety boot logic 111 of device 100 will commence automatically at power on or receiving or detecting a reset instruction or signal from a host, examining default boot code integrity and changing to a redundant boot code copy by modifying swap table if an integrity fault is detected.

In a state 302 a power on reset condition or a reset instruction or signal of the host 97A to force the memory device 100 to reset as if it had experienced a power on event but without any actual power interruption having occurred, is detected and a start safety boot process is triggered.

In a state 306, the control logic 110 invokes the hash engine 115 to examine a current copy of the boot code in memory bank 0 160A of the memory array 160 and calculate a digest.

In a state 324, the control logic 110 locates a digest 116 that was determined for the boot code in NVM Secret area 113, and compares the digest calculated for the current copy of the boot code in memory bank 0 160A of the memory array 160 with the digest 116 that was determined for the boot code retrieved from the NVM Secret area 113. Then the control logic 110 will determine whether the current copy of the boot code in memory bank 0 160A of the memory array 160 passes integrity verification based upon a result of the compare.

If the digest for the current copy and the digest 116 that was determined for the boot code retrieved from the NVM Secret area 113 do not match (e.g., are not equivalent), then in a state 334, the swap table 112 is modified to direct the system to obtain boot code from a redundant boot code copy of the boot code in memory bank 1 160B of the memory array 160.

Further, in a state 336, the swap event is signaled to the host 97A using a status register, signal and/or interrupt so that the host can recover. The difference between status register and signal, like interrupt or else, is: (i) for status registers, the host actively checks the status registers for every read or other operations; because registers are inside memory device 100 and only can accessed by host 97A through a command operation; (ii) for signals, instead a pin is used to physically connect the host to the memory device 100; the memory device 100 will change the state of the signal to notify the host accordingly; and (iii) for interrupt signals, the signal will trigger hardware interrupt and force main control unit or central processing unit (MCU/CPU) to execute the interrupt routine accordingly. In this technology, a major intention is to make host 97A aware of the event happened inside the memory device 100. The host 97A can cope correctly and properly with the event, e.g., apply recovery for the concerned boot code at a convenient time.

In a state 328, a data image is readied for request from a host; the data image comprising blocks from the current copy of the boot code in memory bank 0 160A of the memory array 160 if the integrity check passed and/or blocks from the redundant boot code copy of the boot code in memory bank 1 160B of the memory array 160, if swapping was necessary to maintain integrity (e.g., obtain a data image having a digest equivalently comparing with a stored digest, during power on reset before responding any requests/commands from the host. Of course, the status register of configuration and a status registers 81 is flagged if a swap event is applied during power on. In embodiments, no response is still a response from the point of view of host 97A if the first operation of host 97A is just trying to read boot code from memory device 100 without checking the status first, e.g., by reading ID or else contents of registers of configuration and a status registers 81. In such case, one implementation of the memory device 100 outputs a NOP (No Operation which is defined by users through configuring memory device 100 at first use or during programming stage), e.g., all 0 is one common form of NOP. This output of a NOP merely makes CPU/MCU run a dummy instruction cycle as a wait cycle. Thus, one implementation of the memory device 100 outputs a default NOP, e.g. all 0, at power on till internal reset and integrity check completes.

Having described with reference to FIG. 3A an example of an embedded automatically executing integrity verification without ECC hashing operation conducted using integrity mechanisms like that of FIG. 1, next, two additional embodiments for embedded automatically executing integrity verification in which ECC is incorporated for the secure safety boot will next be described with reference to FIG. 3B and FIG. 3C.

Embedded Integrity Verification with ECC Hashing Operations

FIG. 3B is a state diagram 300B illustrating an embedded integrity checking with ECC hashing operation for an embodiment of an integrated circuit memory device having an integrity maintenance mechanism like that of FIG. 1. In FIG. 3B, any error detected in each ECC check unit, here is a page of 2k bytes or subpage of 512 bytes, will be corrected by ECC parity information first. If any error uncorrectable, the error will propagate to the hash calculation and results in a mismatched hash digest and then triggers a start over with the address swapped to point to another boot code in memory array 160.

In a state 302 a power on reset condition or a reset instruction or signal of the host 97A to force the memory device 100 to reset as if it had experienced a power on event but without any actual power interruption having occurred, is detected and a start safety boot process is triggered.

In a state 304, the control logic 110 obtains a 2 Kbyte page of a current copy of the boot code in memory bank 0 160A of the memory array 160.

In a state 306, the control logic 110 invokes ECC engine 114 to check for errors.

In a state 308, if an error is detected, then in a state 310 determine if the error is correctable. Otherwise, if there is no error, control passes to state 320 below.

In a state 318 a status bit appropriate to correctable or non-correctable is set in a status register of configuration and a status register. The error event can be signaled to the host 97A using the status register, signal and/or interrupt enabling the host can recover.

In a state 320 the control logic 110 invokes the hash engine 115 to calculate a digest for the current copy of the boot code as read out so far.

In a state 322, a check is performed to see if the last page of the boot code has been read out. If not, control passes back to state 304 to read another page. Otherwise control passes to state 324.

In a state 324, the control logic 110 locates a digest 116 that was determined for the boot code in NVM Secret area 113, and compares the digest calculated for the current copy of the boot code in memory bank 0 160A of the memory array 160 with the digest 116 that was determined for the boot code retrieved from the NVM Secret area 113. If the digest for the current copy and the digest 116 that was determined for the boot code retrieved from the NVM Secret area 113 do not match (e.g., are not equivalent), then control passes to state 326. Otherwise, in a state 328, a data image is readied for response to the host. In some implementations, no response is still a response from the point of view of host 97A if the first operation of host 97A is just trying to read boot code from memory device 100 without checking the status first, e.g., by reading ID or else contents of registers of configuration and a status registers 81. In such case, one implementation of the memory device 100 outputs a NOP (No Operation which is defined by users through configuring memory device 100 at first use or during programming stage), e.g., all 0 is one common form of NOP. This output of a NOP merely makes CPU/MCU run a dummy instruction cycle as a wait cycle. Thus, one implementation of the memory device 100 outputs a default NOP, e.g. all 0, at power on till internal reset and integrity check completes.

In a state 326, a check is performed to see if a boot images have been swapped. If so, then in a state 330 the error and the swap are signaled to the host 97A via the status register and in state 332 a timeout condition is signaled to the host. Otherwise, if no swap has occurred, control passes to state 334.

In a state 334, the swap table 112 is modified to direct the system to obtain boot code from a redundant boot code copy of the boot code in memory bank 1 160B of the memory array 160. Further, in a state 336, the swap event can be signaled to the host 97A using a status register, signal and/or interrupt so that the host can recover. Then, in a state 338, the safety boot processes starts over with the swapped boot code by passing control to state 302.

Having described with reference to FIG. 3B an example of an embedded automatically executing integrity verification with ECC hashing operation conducted using integrity mechanisms like that of FIG. 1 next, an additional embodiment for embedded automatically executing integrity verification in which ECC is incorporated for the secure safety boot will next be described with reference to FIG. 3C.

Embedded Integrity Verification with ECC Hashing and Redundant Pages Bitmap Operations FIG. 3C is a state diagram 300C illustrating another implementation of an embedded integrity checking with ECC hashing operation for an embodiment of an integrated circuit memory device having an integrity maintenance mechanism like that of FIG. 1. In FIG. 3C, an alternative approach for the uncorrectable pages or subpages is depicted. It will resort to redundant ones immediately with a bitmap record of the error page. This bitmap is used to indicate whether a redundant page is being visited or not. The host 97A can further leverage this bitmap to know the pages for recovery.

In a state 302 a power on reset condition or a reset instruction or signal of the host 97A to force the memory device 100 to reset as if it had experienced a power on event but without any actual power interruption having occurred, is detected and a start safety boot process is triggered.

In a state 304, the control logic 110 obtains a 2 Kbyte page of a current copy of the boot code in memory bank 0 160A of the memory array 160.

In a state 306, the control logic 110 invokes ECC engine 114 to check for errors.

In a state 308, if an error is detected, then in a state 310 the ECC engine 114 determines if the error is correctable. If the error is not correctable, then in a state 312, status bits appropriate to the condition are set in a status register of configuration and status register 81. The error event can be signaled to the host 97A using the status register, signal and/or interrupt enabling the host can recover. Then in a step 314, a bitmap is marked to record the uncorrectable pages. In a state 316, a redundant page is read out and control passes back to state 306 to apply the ECC to the redundant page just read.

In a state 318 a status bit appropriate to correctable is set in a status register of configuration and status register 81. The error event can be signaled to the host 97A using the status register, signal and/or interrupt enabling the host can recover.

In a state 320 the control logic 110 invokes the hash engine 115 to calculate a digest for the current copy of the boot code as read out so far.

In a state 322, a check is performed to see if the last page of the boot code has been read out. If not, control passes back to state 304 to read another page. Otherwise control passes to state 324.

In a state 324, the control logic 110 locates a digest 116 that was determined for the boot code in NVM Secret area 113, and compares the digest calculated for the current copy of the boot code in memory bank 0 160A of the memory array 160 with the digest 116 that was determined for the boot code retrieved from the NVM Secret area 113. If the digest for the current copy and the digest 116 that was determined for the boot code retrieved from the NVM Secret area 113 do not match (e.g., are not equivalent, or are not similar within a tolerance), then control passes to state 326. Otherwise, in a state 328, a data image is readied for response to the host. In some implementations, no response is still a response from the point of view of host 97A if the first operation of host 97A is just trying to read boot code from memory device 100 without checking the status first, e.g., by reading ID or else contents of registers of configuration and a status registers 81. In such case, one implementation of the memory device 100 outputs a NOP (No Operation which is defined by users through configuring memory device 100 at first use or during programming stage), e.g., all 0 is one common form of NOP. This output of a NOP merely makes CPU/MCU run a dummy instruction cycle as a wait cycle. Thus, one implementation of the memory device 100 outputs a default NOP, e.g. all 0, at power on till internal reset and integrity check completes.

In a state 326, a decision is performed to see if a boot images have been swapped. If so, then in a state 330 the error and the swap are signaled to the host 97A via the status register and in state 332 a timeout condition is signaled to the host. No output is returned in this case. Otherwise, control passes to state 334.

In a state 334, the swap table 112 is modified to direct the system to obtain boot code from a redundant boot code copy of the boot code in memory bank 1 160B of the memory array 160. Further, in a state 336, the swap event can be signaled to the host 97A using a status register, signal and/or interrupt so that the host can recover. Then, in a state 338, the safety boot processes starts over with the swapped boot code by resetting the bitmap and passing control to state 302.

Having described with reference to FIG. 3C an example of an embedded automatically executing integrity verification with ECC hashing operation and redundant bitmap conducted using integrity mechanisms like that of FIG. 1, next, an on-the-fly integrity verification without ECC hashing operation conducted using like security mechanisms will be described with reference to state diagram of FIG. 4A.

On-the-Fly Integrity Verification without ECC Hashing Operations

Now with reference to state diagram 400A of FIG. 4A, an example of an on-the-fly integrity checking without ECC hashing operation for a boot code data image will be described. FIG. 4A depicts a state diagram 400A illustrating an on-the-fly integrity checking without ECC hashing operation for an embodiment of an integrated circuit memory device 100 having an integrity maintenance mechanism like that of FIG. 1. In FIG. 4A, secure safety boot 111 of device 100 comprises an on-the-fly secure safety boot logic 401, which is preferably implemented in logic circuitry. In a typical scenario, the host/system 97A is started by execution of ROM stored code, e.g., "first stage boot code", or code from embedded flash memory, to configure hardware and prepare to load into RAM on the system (rather than on the memory chip 100) either bootloader, e.g., "second stage boot code", or application residing in external flash (e.g., memory device 100). The RAM on system may be the on-chip RAM of the host SoC (System on Chip, i.e., a group of processing units separately packaged, now brought together on a single chip) or external standalone RAM or DRAM chips on the system. As used herein, the "embedded flash" is flash memory inside the host SoC chip. As used herein, the "external flash" is an implementation of memory device 100 embodying the present technology. Some SoC or MCU chips are equipped with embedded flash for boot code or application(s). However, some employ ROM (Read Only Memory) as first stage boot code which is used to access the external second stage boot code or application resided in the external flash.

In the case of on-the-fly examining of a boot code data image, the flash memory device 100 is about to feed the read data to the hash engine 115 only when host 97A accesses the boot code and goes through entire boot code contiguously. If the flash memory device 100 detects any unexpectedly incontiguous access, it will reset the hash engine 115 and skip the comparison step.

Therefore, users will configure the area in which the boot code is stored and then flash memory device 100 relies on this configuration to indicate where the boot code is stored and abort hash engine 115 if any access from outside the boot code area occurs. That means boot code area is contiguously accessed and copied from flash memory device 100 to the on-chip RAM or system RAM/DRAM of the host 97A. Any other operations or accesses outside the boot code area will abort the hash comparison or just fail in integrity check.

If the flash memory device 100 is accessed by host 97A from the start of boot code, every portion of data read out will also be fed into the hash engine 115 for digest calculation until the end of the boot code is reached. Flash memory device 100 stores the length and area of boot code and redundant ones through users configuring the non-volatile registers 81B. In some implementations, the host can check an integrity report from the memory device 100 via a status register or a signal pin after copying code to RAM but before executing. As described above, the host can either check the status registers regularly for each read operation or responsive to a physical signal. If a physical signal used to notify an event happened, the host can check the status by reading status registers. Of course, if the physical signal is an interrupt signal known by host hardware, any event on the interrupt signal will trigger an interrupt routine accordingly. If the integrity check has failed, in this implementation the operation to copy the boot code will start over copying the redundant boot code.

In this implementation, the shadowing boot scenario is described. Typically, embodiments will follow a general shadowing boot flow comprising: (i) the host is booted from either ROM or embedded flash. This is the first boot stage. The purpose of first boot stage is to initialize host SoC/MCU internal registers and status, major hardware modules like flash interface controller, reset internal RAM, SRAM/DRAM controller, interrupt controller and so on; (ii) once the second stage boot code or application is copied from the flash memory device 100 to RAM, CPU/MCU will start to execute the program (boot code or application) from the RAM.

In a state 402 a power on reset condition of the host 97A or a request from host 97A is detected/received and an on-the-fly secure safety boot process commences with as boot code begins to be copied ("shadowed") from the flash memory device 100 to RAM memory of the host 97A.

In states 404 and 405, responsive to the host 97A requesting to read out boot code, one or more bytes (or words or blocks) of boot code from the current copy of the boot code is shadowed from memory bank 0 160A of the memory array 160 to the of the host 97A.

In a state 406, hash engine 115 examines the bytes requested by the host in state 404, updates a calculation of a digest, and outputs the bytes to the host responsive to the host's request. As shown in FIG. 7, in one implementation, every 512 bits (64 bytes) are fed into a compression function till the end of boot code with padded bits.

In a state 422, if additional read requests are received for boot code from the current copy of the boot code in memory bank 0 160A of the memory array 160 then control is passed back to state 404. Otherwise, if no further boot code is requested to be read, control passes to state 424.

In a state 424, the control logic 110 locates a digest for the boot code in NVM Secret area 113, and compares the digest calculated for the current copy of the boot code in memory bank 0 160A of the memory array 160 with the digest for the boot code retrieved from the NVM Secret area 113. The control logic 110 will determine that the current copy of the boot code in memory bank 0 160A of the memory array 160 passes integrity verification based upon a result of the compare. If the digest for the current copy and the digest for the boot code retrieved match (e.g., equivalent), then in a state 426, copying and providing the data image of the that the current copy of the boot code in memory bank 0 160A of the memory array 160 is complete and in a state 428 the host executes the copy in RAM.

Otherwise, if calculated and stored hash values do not match in state 424, in a state 434, the swap table 112 is modified to direct the addressing to obtain boot code from a redundant boot code copy of the boot code in memory bank 1 160B of the memory array 160. Further, in a state 436, the swap event is signaled to the host 97A using a status register, signal and/or interrupt so that the host can recover. As described above, the host can either check the status registers regularly for each read operation or be signaled by an interrupt. If a physical signal used to notify the host that an event happened, the host can check the status by reading status registers. Of course, if the physical signal is an interrupt signal known by the host's hardware, any event on the interrupt signal will trigger an interrupt routine accordingly.

In a state 438 the host receives the signal raised in state 436 and detects that an integrity failure has occurred. The host is aware of integrity check failure by 436 and in a state 440 restarts whole shadowing operation by reading again. But this time the address will be swapped and directed to redundant boot code because of state 434 where swap table is modified. The swap table could be volatile or non-volatile. For volatile swap table, there is a default area of boot code because the swap table is fixed once. For the non-volatile swap table, the default area of boot code is dependent on the swap table at the time. That means, the roles of default boot code and the redundant are not fixed and dependent on the swap table. And the modification operation is actually toggling the swap bit of swap table 202, S20-S10, for example.

Having described with reference to FIG. 4A an example of an on-the-fly integrity checking without ECC hashing operation for a boot code data image implemented in mechanisms like that of FIG. 1, next, an on-the-fly integrity checking with ECC hashing incorporated will next be described with reference to FIG. 4B.

On-the-Fly Integrity Verification with ECC Hashing Operations

Now with reference to state diagram 400B of FIG. 4B, an example of an on-the-fly integrity checking with ECC hashing operation for a boot code data image will be described. FIG. 4B depicts a state diagram 400B illustrating an on-the-fly integrity checking with ECC hashing operation for an embodiment of an integrated circuit memory device 100 having an integrity maintenance mechanism like that of FIG. 1. In FIG. 4B, secure safety boot 111 of device 100 comprises an on-the-fly secure safety boot logic 401, which is preferably implemented in logic circuitry. In a typical scenario, the host/system 97A is started by execution of ROM stored code, or code from embedded flash memory, to configure hardware and prepare to load into RAM on the system (rather than on the memory chip 100) either a bootloader or application residing in external flash (e.g., memory device 100).

In a state 402 a power on reset condition of the host 97A or a request from host 97A is detected/received and an on-the-fly secure safety boot process commences as boot code begins to be copied ("shadowed") from the flash memory device 100 to RAM memory of the host 97A.

In states 404 and 405, responsive to the host 97A requesting to read out boot code, one or more bytes (or words or blocks) of boot code from the current copy of the boot code is shadowed from memory bank 0 160A of the memory array 160 to the of the host 97A.

In a state 406, the control logic 110 invokes ECC engine 114 to check for errors. In a state 406, ECC engine 114 examines the bytes requested by the host in state 404 for errors, corrects any errors that are correctable, and outputs the bytes to the host responsive to the host's request. As shown in FIG. 7, in one implementation, every 512 bits (64 bytes) are fed into a compression function till the end of boot code with padded bits.

In a state 408, if an error is detected, then in a state 410 the ECC engine 114 determines if the error is correctable. If the error is not correctable, then in a state 411 a decision is made whether the boot code is being read from a redundant page. If not, then in a state 412, status bits appropriate to the condition are set in a status register of configuration and status register 81. The error event can be signaled to the host 97A using the status register, signal and/or interrupt enabling the host can recover. Then in a state 414, a bitmap is marked to record the uncorrectable pages. In a state 416, a redundant page is read out and control passes back to state 406 to apply the ECC to the redundant page just read. Otherwise, if the boot code is already being read from a redundant page in state 411, then in a state 430 the error and the swap are signaled to the host 97A via the status register and in state 432 a timeout condition is signaled to the host. No output is returned in this case.

Otherwise, if the error is correctable in state 410, control passes to a state 418, in which a status bit appropriate to correctable is set in a status register of configuration and status register 81. The error event can be signaled to the host 97A using the status register, signal and/or interrupt enabling the host can recover.

If there is no error in state 408, or if there is an error but it is correctable in state 410, then in a state 420 the control logic 110 invokes the hash engine 115 to calculate a digest for the current copy of the boot code as read out so far.

In a state 422, if additional read requests are received for boot code from the current copy of the boot code in memory bank 0 160A of the memory array 160 then control is passed back to state 404. Otherwise, if no further boot code is requested to be read, control passes to state 424.

In a state 424, the control logic 110 locates a digest for the boot code in NVM Secret area 113, and compares the digest calculated for the current copy of the boot code in memory bank 0 160A of the memory array 160 with the digest for the boot code retrieved from the NVM Secret area 113. The control logic 110 will determine that the current copy of the boot code in memory bank 0 160A of the memory array 160 passes integrity verification based upon a result of the compare. If the digest for the current copy and the digest for the boot code retrieved match (e.g., equivalent), then in a state 426, copying and providing the data image of the that the current copy of the boot code in memory bank 0 160A of the memory array 160 is complete and in a state 428 the host executes the copy in RAM.

Otherwise, if calculated and stored hash values do not match in state 424, in a state 434, the swap table 112 is modified to direct addressing to obtain boot code from a redundant boot code copy of the boot code in memory bank 1 160B of the memory array 160. Further, in a state 436, the swap event is signaled to the host 97A using a status register, signal and/or interrupt so that the host can recover. As described above, the host can either check the status registers regularly for each read operation or be signaled by an interrupt. If a physical signal used to notify the host that an event happened, the host can check the status by reading status registers. Of course, if the physical signal is an interrupt signal known by the host's hardware, any event on the interrupt signal will trigger an interrupt routine accordingly.

In a state 438 the host receives the signal raised in state 436 and detects that an integrity failure has occurred. The host is aware of integrity check failure by 436 and in a state 440 resets the bitmap and control passes to state 402 to restart the whole shadowing operation by reading again. But this time the address will have been swapped in state 434 where swap table is modified, so the read is directed to a redundant boot code copy.

Having described with reference to FIG. 4B an example of an on-the-fly integrity checking with ECC hashing operation for a boot code data image implemented in mechanisms like that of FIG. 1, next, an on-the-fly integrity checking without ECC hashing using encrypted digests will next be described with reference to FIG. 5.

On-the-Fly Integrity Verification with Encrypted Digests, without ECC Hashing Operations Now with reference to state diagram 500 of FIG. 5, FIG. 5 is a state diagram illustrating an on-the-fly integrity checking operation without ECC using encrypted digests for an embodiment of an integrated circuit memory device 100 having an integrity maintenance mechanism like that of FIG. 1. FIG. 5 depicts a state diagram 500 illustrating an on-the-fly integrity checking operation, similar to the scenario depicted by FIG. 4. In FIG. 5, however, the flash memory receives an encryption key from the host, uses it to decrypt the stored hash digest for comparing the computed hash value when determining whether an integrity fault has been experienced. If the digest decrypts correctly, with only the correct key. That means the host is authenticated by providing the correct key. Here asymmetric key (public and private key pair) scheme can be used. The digest is encrypted by a public key when programming code into flash memory device 100. And a private key is sent to flash memory device 100 for authentication through correctly decrypting the digest for integrity check before accessing boot code.

In FIG. 5, secure safety boot 111 of device 100 comprises an on-the-fly secure safety boot logic 501, which is preferably implemented in logic circuitry. In a typical scenario, the host/system 97A is started by execution of ROM stored code, or code from embedded flash memory, to configure hardware and prepare to load either bootloader or application residing in external flash.

In a state 501a, a decryption key is sent to the device 100 (e.g., a flash memory holding boot code) from host 97A. In a state 501b, the memory device 100 uses the received key to decrypt the hash value in the digest and only the correct key will get the correct digest and then pass the comparison. Therefore, the memory device 100 authenticates host by digest comparison rather than checking the key received. Control passes to state 502.

In a state 502 a power on reset condition of the host 97A or a request from host 97A is detected/received and a boot code is copied ("shadowed") to RAM memory of the host 97A, external to the memory device 100.

In a state 504, the host 97A requests to read one or more bytes (or words or blocks) of boot code from the current copy of the boot code in memory bank 0 160A of the memory array 160 In a state 506, hash engine 115 examines the bytes requested by the host in state 504, updates a calculation of a digest, and outputs the bytes to the host responsive to the host's request. As shown in FIG. 7, in one implementation, every 512 bits (64 bytes) are fed into a compression function till the end of boot code with padded bits.

In a state 508, if additional read requests are received for boot code from the current copy of the boot code in memory bank 0 160A of the memory array 160 (RAM) then control is passed back to state 504. Otherwise, if no further boot code is requested to be read, control passes to state 510.

In a state 510, the control logic 110 compares the digest calculated for the current copy of the boot code in memory bank 0 160A of the memory array 160 with the decrypted digest for the boot code retrieved from the NVM Secret area 113. The control logic 110 will determine that the current copy of the boot code in memory bank 0 160A of the memory array 160 passes integrity verification based upon a result of the compare. If the digest for the current copy and the decrypted digest for the boot code retrieved match (e.g., equivalent, or similar within a tolerance), then in a state 512, copying and providing the data image of the that the current copy of the boot code in memory bank 0 160A of the memory array 160 is complete and in a state 514 the host executes the copy shadowed in the host's RAM.

Otherwise, in a state 516, the swap table 112 is modified to direct the addressing to obtain boot code from a redundant boot code copy of the boot code in memory bank 1 160B of the memory array 160. Further, in a state 518, the swap event is signaled to the host 97A using a status register, signal and/or interrupt so that the host can recover. In a state 520 the host receives the signal raised in state 518 and detects that an integrity failure has occurred. In a state 522, the redundant boot code copy of the boot code in memory bank 1 160B of the memory array 160 will be copied to the host's RAM and the next state is again state 502 to re-commence the process using the redundant boot code copy of the boot code in memory bank 1 160B of the memory array 160.

Other Integrity Verification Operations

Figure 6:
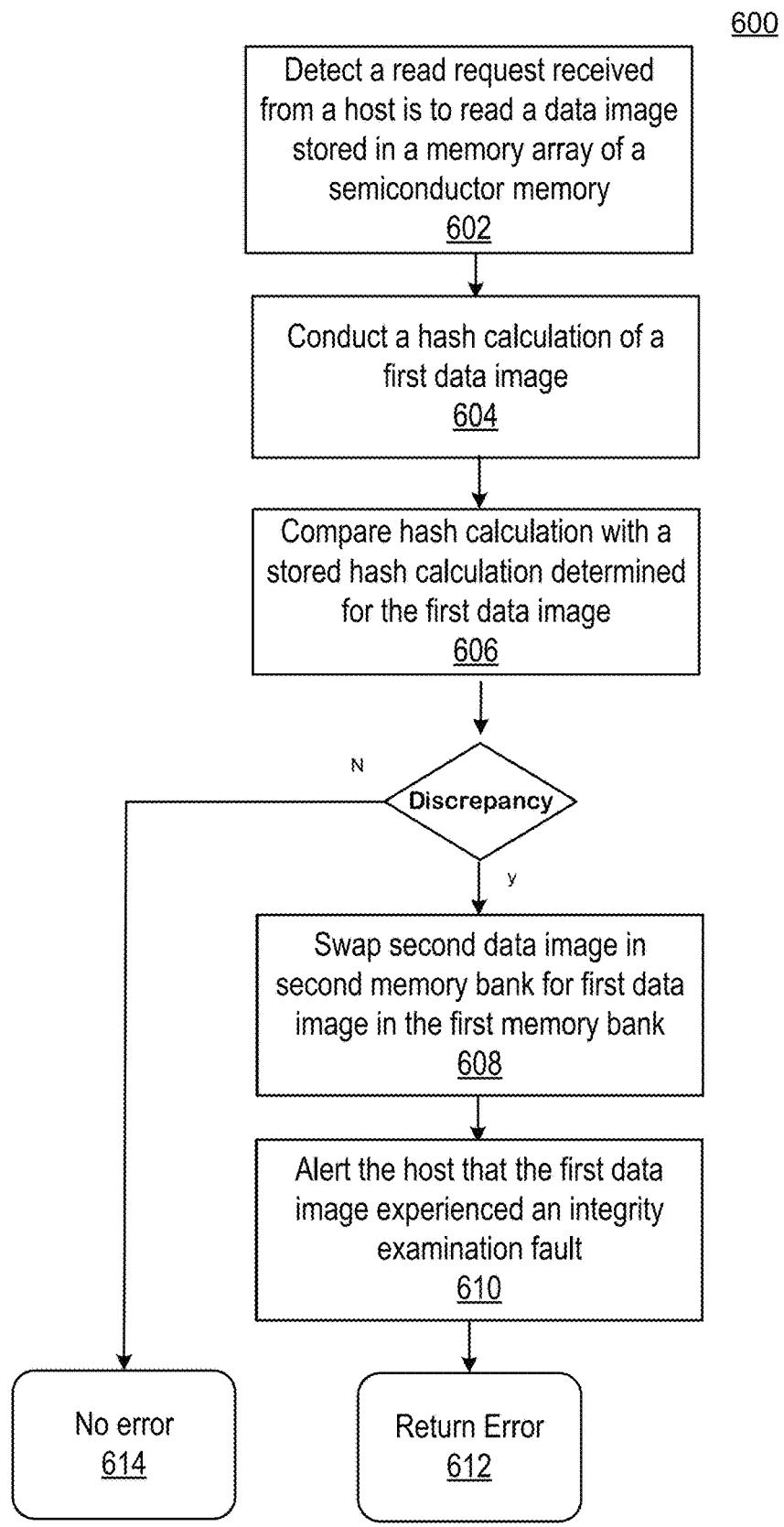
FIG. 6 is a flowchart illustrating an integrity verification operation of an integrated circuit memory device having an integrity maintenance mechanism like that of FIG. 1.

FIG. 6 is a flowchart illustrating maintaining integrity in a data image during operations of semiconductor memory like that of FIG. 1. The device is not necessarily part of the method.

In a block 602, a read request is detected. The read request received from a host is to read a data image stored in a memory array of a semiconductor memory.

In a block 604, a hash calculation of the data image is conducted.

In a block 606, the hash calculation is compared with a stored hash calculation determined for the data image.

In a block 610, the host is alerted that the data image experienced an integrity examination fault whenever a discrepancy between the hash calculation and the stored hash calculation determined for the data image is detected.

Optionally, in a block 608, a second data image is swapped for the data image readout by the host, thereby further facilitating recovery from a detected integrity verification fault at a convenient time after booting successfully.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Figure 7:
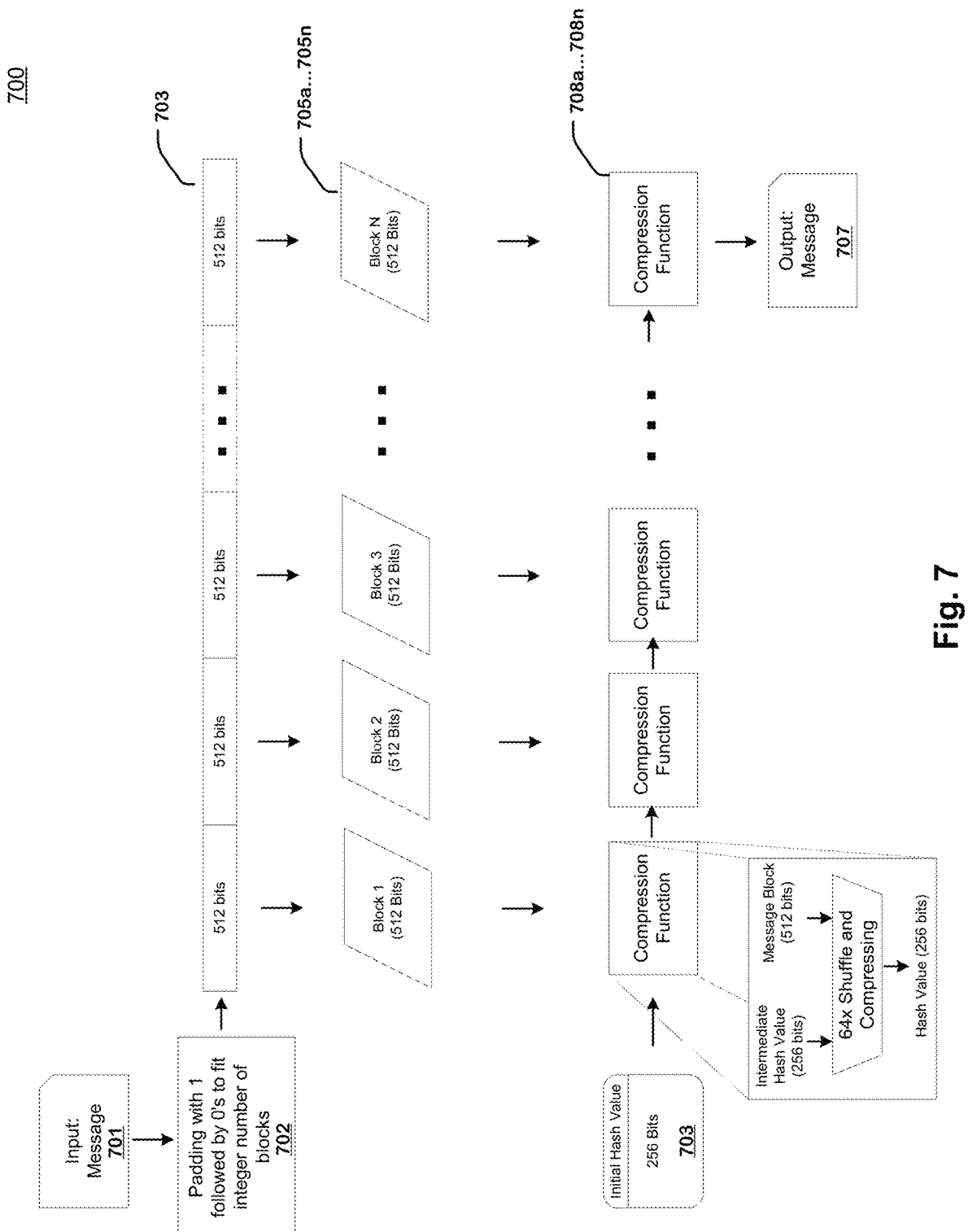
FIG. 7 is a state diagram illustrating an example secure hashing algorithm usable in an integrated circuit memory device having an integrity maintenance mechanism like that of FIG. 1.

FIG. 7 is a state diagram illustrating an example secure hashing algorithm usable in an integrated circuit memory device having an integrity maintenance mechanism like that of FIG. 1. In a typical scenario, responsive to a power on reset or a command by host/system 97A, control logic 110 of memory device 100, in the embedded flow of FIGS. 3A-3B or conducted by the host in the on-the-fly flow of FIGS. 4A-4B and FIG. 5, automatically commences reading data (701 in FIG. 7) from a stored data image of boot instructions (or other valuable data) out of memory array 160, computing a hash value 707 using a secure hashing algorithm, such as SHA2-256 (32 byte implementation), shown schematically by FIG. 7, or SHA2-512 (64 byte implementation).

In a state 702 the input message 701 is padded with a 1 followed by a number of 0s in order to create a padded message 703 that fits into an integer number of blocks 705a . . . 705n.

Next, in states 708a . . . 708n, compression functions are applied to the blocks 705a . . . 705n. Each of states 708b . . . 708n takes as an input a result of a state $708_{(n-1)}$.

State 708a takes as input an Initial hash value 703 as a "seed" value. Each of states 708a . . . 708n also takes a 512-bit message block from message blocks 705a . . . 705n. Each of states 708a . . . 708n applies algorithmic shuffling of hash values computed by a state $708_{(n-1)}$ and a message block 705a . . . 705n and compressing the results to produce a 256 bit hash value as output for that state. The hash value output by the final state is returned as an output message 707, comprising the hash value computed for the data image by the hash engine 112. The digest may be calculated externally and also encrypted by a key (public key or a shared secret key). The boot code and the digest are then programmed into the memory device at the first use of the memory device in tandem with other configurations like boot area information, boot code length, embedded mode or on-the-fly mode, and generic setup. Of course, other sizes of blocks can be employed as well as other types of secure hashing algorithms as will be evident to those of skill in the art.

Any data structures and code described or referenced above are stored according to many implementations on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

A byte is a basic storage unit used in many integrated circuit logic and memory circuits, and consists of eight bits. Basic storage unit can have other sizes, including for example one bit, two bits, four bits, 16 bits and so on. Thus, the description of a hash logic circuitry and method set out above, and in other examples described herein utilizing the term byte, applies generally to circuits using different sizes of storage units, as would be described by replacing the term byte or set of bytes, with storage unit or set of storage units. Also, in some embodiments different sizes of storage units can be used in a single command sequence, such as one or more four bit storage units combined with eight bit storage units.

A number of flowcharts illustrating logic executed by a memory controller or by memory device are described herein. The logic can be implemented using processors programmed using computer programs stored in memory accessible to the computer systems and executable by the processors, by dedicated logic hardware, including field programmable integrated circuits, and by combinations of dedicated logic hardware and computer programs. With all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that numerous additional steps for accomplishing other functions can be performed before, after and between those shown.

As used herein, a network node, including network nodes referred to as client side nodes and a server side nodes, is an active electronic device that is attached to a network, and is capable of sending, receiving, or forwarding information in support of computer programs such as servers and clients, over a physical media for a communications channel on the network, and having for example media access control addresses and protocol stacks that support higher network layers. A network can include the networks using Internet Protocol addresses, or other type of network layer addresses. In some embodiments the network comprises the Internet. Examples of electronic devices which can be deployed as network nodes, include all varieties of computers, workstations, laptop and desktop computers, hand-held computers and smart phones, and execute computer programs.

A device having a controller logic circuitry, and a method responsive to any one of a reset command, a power on reset, and a command sequence including a memory read command, are described herein.

A device having a controller logic circuitry, and a method responsive to any one of a reset command, a power on reset, and a command sequence including a memory read command, are described, including responsively examining integrity of a data image.

A device having a controller logic circuitry, and a method responsive to any one of a reset command, a power on reset, and a command sequence including a memory read command, are described, including responsively examining integrity of a data image by conducting a hash calculation of the data image, comparing the hash calculation with a stored hash calculation determined for the data image and alerting a host that the data image experienced an integrity examination fault whenever a discrepancy between the hash calculation and the stored hash calculation determined for the data image is detected.

A device having a controller logic circuitry, and a method responsive to any one of a reset command, a power on reset, and a command sequence including a memory read command, are described, including responsively examining integrity of a data image of boot instructions for a host by conducting a hash calculation of a first data image comprising boot instructions for the host; and comparing the hash calculation with a stored hash calculation determined for the first data image; and alerting the host that the first data image experienced an integrity examination fault whenever a discrepancy between the hash calculation and the stored hash calculation determined for the first data image is detected.

A device having a controller logic circuitry, and a method responsive to any one of a reset command, a power on reset, and a command sequence including a memory read command, are described, including responsively examining integrity of a data image of boot instructions for a host by conducting a hash calculation of a first data image comprising boot instructions for the host; and comparing the hash calculation with a stored hash calculation determined for the first data image; and alerting the host that the first data image experienced an integrity examination fault whenever a discrepancy between the hash calculation and the stored hash calculation determined for the first data image is detected; and either (i) in an embedded flow, swapping a data image comprising a redundant copy of the data image stored in the second bank for the data image in the first memory bank whenever a discrepancy between the hash calculation and a stored hash calculation determined for the data image is detected; or (ii) in an on-the-fly-flow, the host issuing a read operation to access the boot code again from the beginning for the swapped data image comprising a redundant copy of the data image stored in the second bank for the data image if a discrepancy of hash is detected. It is not necessary to store the redundant copy or second data image in the second bank. That means both first and second can be either in the same bank or in different banks. Of course, implementations can achieve benefits in performance and circuit implementation for using different banks.

A device having a controller logic circuitry, and a method responsive to any one of a reset command, a power on reset, and a command sequence including a memory read command, are described, including responsively examining integrity of a data image of boot instructions for a host by conducting a hash calculation of a first data image comprising boot instructions for the host; and comparing the hash calculation with a stored hash calculation determined for the first data image; and alerting the host that the first data image experienced an integrity examination fault whenever a discrepancy between the hash calculation and the stored hash calculation determined for the first data image is detected; and either (i) in an embedded flow, swapping a second data image stored in a second memory bank for the first data image in the first memory bank whenever a discrepancy between the hash calculation and a stored hash calculation determined for the first data image is detected; or (ii) in an on-the-fly-flow, the host issuing a read operation to access the boot code again from the beginning for the swapped data image comprising a redundant copy of the data image stored in the second bank for the data image if a discrepancy of hash is detected. It is not necessary to store the redundant copy or second data image in the second bank. That means both first and second can be either in the same bank or in different banks. Of course, implementations can achieve benefits in performance and circuit implementation for using different banks.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed is:

1. A memory device, comprising:
a plurality of non-volatile registers storing address information for a first copy boot code and at least one redundant copy boot code stored in a memory array;
a non-volatile storage area that keeps a hash digest;
an input/output interface for posting internal status register states to I/O data units;
data path circuits connected between non-volatile registers, the memory array, the non-volatile storage area, and the input/output interface; and
logic circuitry that examines integrity of the first copy boot code stored in the memory array by implementing (i) a first tier hash for determining an initial integrity of the first copy boot code and (ii) a second tier hash using a message digest algorithm for integrity checking an entirety of the first copy boot code and comparing a hash calculation of the first copy boot code and a stored hash calculation determined and stored in the non-volatile storage area holding the hash digest and providing as output one selected from the first copy boot code or the redundant copy boot code in accordance with an integrity examination result.

2. The memory device of claim 1, further including an error correcting code (ECC) circuit, and wherein the logic circuitry implements the first tier hash by using a page-based or a sub-page based ECC to determine the initial integrity of the first copy boot code.

3. The memory device of claim 2, wherein the logic circuitry further implements swapping the at least one redundant copy boot code whenever the ECC indicates a failed integrity of the first copy boot code; and
notifying a host by at least one of an interrupt and a status register.

4. The memory device of claim 2, wherein logic circuitry implements the second tier hash using the message digest algorithm for integrity checking an entirety of the first copy boot code.

5. The memory device of claim 2, wherein logic circuitry implements a second tier hash, the logic circuitry further implementing starting over from the at least one redundant copy boot code when errors are found within the first copy boot code.

6. The memory device of claim 2, wherein the logic circuitry further implements marking a bitmap for an error encountered in a page of the first copy boot code and swapping a corresponding one of the at least one redundant copy boot code whenever the ECC indicates a failed integrity of the first copy boot code.

7. The memory device of claim 2, further including the error correcting code (ECC) correcting some errors, and further including logic circuitry that checks whether the errors are correctable; and swaps redundant copy boot code portions only when errors are not correctable.

8. The memory device of claim 1, further including logic circuitry that conducts an embedded flow at power on reset command or reset signal received and prior to responding any requests or commands, wherein the embedded flow includes responsive to a power on reset command or reset signal, checking integrity of the first copy boot code and swapping, whenever a failed integrity check is detected, to at least one redundant copy boot code.

9. The memory device of claim 8, further including an error correcting code (ECC) circuit, and wherein the logic circuitry further implements a first tier hash comprising a page-based or a sub-page based ECC determining an initial integrity of the first copy boot code.

10. The memory device of claim 1, further including logic circuitry that conducts an on-the-fly flow at power on reset command or reset signal received in response to requests or commands, wherein the on-the-fly flow includes responsive to a read request, checking integrity of the first copy boot code and swapping, whenever a failed integrity check is detected, to at least one redundant copy boot code.

11. The memory device of claim 1, further including a swap table maintained in non-volatile storage; and wherein the logic circuitry uses the swap table to determine a default first copy boot code to load.

12. The memory device of claim 1, further including logic circuitry to decrypt the hash digest prior to integrity checking by:
receiving a key from a host;
decrypting the hash digest using the key received; and
failing the hash digest whenever a wrong key is provided.

13. The memory device of claim 1, further including logic circuitry that provides an interrupt signal notifying a host to check status registers for status updates within the memory device.

14. The memory device of claim 1, further including the logic circuitry dividing the first copy boot code into parts and for each part maintaining a separate hash digest only for that part.

15. The memory device of claim 1, further including storing the first copy boot code and the at least one redundant copy boot code into different banks, each with its own Sense Amplifier and Buffer; thereby enabling each to operate at least partially concurrently with one another.

16. The memory device of claim 1, further including the logic circuitry implementing responsive to receiving a command, conducting integrity checking of one or more of the first copy boot code and the at least one redundant copy boot code.

17. The memory device of claim 1, further including logic circuitry that alerts a host that the first copy boot code or the redundant copy boot code experienced an integrity examination fault whenever a discrepancy between the hash calculation and the stored hash calculation is detected.

18. The memory device of claim 1, wherein redundant copy boot code is different from the first copy boot code.

19. A memory device, comprising:
a plurality of non-volatile registers storing address information for a first copy boot code and at least one redundant copy boot code stored in a memory array;
a non-volatile storage area that keeps a hash digest;
an input/output interface for posting internal status register states to I/O data units;
data path circuits connected between non-volatile registers, the memory array, the non-volatile storage area, and the input/output interface;
logic circuitry that examines integrity of the first copy boot code stored in the memory array by comparing a hash calculation of the first copy boot code and a stored hash calculation determined and stored in the non-volatile storage area holding the hash digest and providing as output one selected from the first copy boot code or the redundant copy boot code in accordance with an integrity examination result; and
a bitmap maintained in storage,
wherein the logic circuitry uses the bitmap to track swapped pages swapped from the at least one redundant copy boot code and the first copy boot code.

20. A method for maintaining integrity in a data image during operations of semiconductor memory, the method comprising:
storing, in a plurality of non-volatile registers, address information of a first copy boot code and at least one redundant copy boot code stored in a memory array;
keeping, in a non-volatile storage area, a plurality of hash digests for the first copy boot code and at least one redundant copy boot code;
posting, to an input/output interface to an I/O data unit, internal status register states; and
examining, by logic circuitry, integrity of the first copy boot code stored in the memory array by:
performing a first tier integrity check of the first copy boot code and a second tier integrity check of the first copy boot code using a message hashing algorithm;
comparing a hash calculation of the first copy boot code and a stored hash calculation as determined and as stored in the non-volatile storage area holding the plurality of hash digests; and
providing as output one selected from the first copy boot code and the redundant copy boot code in accordance with an integrity examination result; and
alerting a host that the first copy boot code or the redundant copy boot code as selected experienced an integrity examination fault whenever a discrepancy between the hash calculation and the stored hash calculation is detected.

21. The method of claim 20, wherein examining by logic circuitry integrity of the first copy boot code stored further includes making the first tier integrity check using an error correcting code (ECC) and the second tier integrity check using a message hashing algorithm.

* * * * *